United States Patent

Kennedy et al.

[11] Patent Number: 6,094,857
[45] Date of Patent: Aug. 1, 2000

[54] METHOD AND MEANS FOR PREVENTING OR MINIMIZING TERMITE ATTACK OR INFESTATION

[76] Inventors: Anthony William Kennedy, "Abbeyards", Lot 2 Springbrook Road, Mudgeeraba Queensland 4213; John Charles Hitchen, PO Box 2088 MDC, Burleigh Queensland 4220, both of Australia

[21] Appl. No.: 09/029,392
[22] PCT Filed: Sep. 2, 1996
[86] PCT No.: PCT/AU96/00542
  § 371 Date: Feb. 27, 1998
  § 102(e) Date: Feb. 27, 1998
[87] PCT Pub. No.: WO97/09491
  PCT Pub. Date: Mar. 13, 1997

[30] Foreign Application Priority Data

Sep. 1, 1995 [AU] Australia .................. PN 5151

[51] Int. Cl.⁷ .................. A01M 1/20; A01M 5/00; A01M 7/00; A01M 17/00
[52] U.S. Cl. .................. 43/132.1; 43/124
[58] Field of Search .................. 43/132.1, 131, 43/124; 52/101, 741.3

[56] References Cited

U.S. PATENT DOCUMENTS

| | | | |
|---|---|---|---|
| 3,602,248 | 8/1971 | Peacock | 137/357 |
| 4,468,405 | 8/1984 | Rigterink et al. | 514/594 |
| 5,184,418 | 2/1993 | Fletscherr | 43/104 |
| 5,347,749 | 9/1994 | Chitwood et al. | 43/124 |
| 5,359,806 | 11/1994 | Jeffery et al. | 43/131 |
| 5,378,086 | 1/1995 | Campbell, Jr. et al. | 405/224 |
| 5,417,017 | 5/1995 | Toutountzis | 52/101 |
| 5,566,500 | 10/1996 | Long | 43/121 |
| 5,678,362 | 10/1997 | Hulls et al. | 52/105 |
| 5,756,114 | 5/1998 | Peterson | 424/405 |
| 5,819,466 | 10/1998 | Aesch et al. | 43/123 |
| 5,860,266 | 1/1999 | Martinet et al. | 52/741.3 |

FOREIGN PATENT DOCUMENTS

| | | |
|---|---|---|
| 59-018822 | 1/1984 | Japan . |
| 993369 | 9/1988 | Japan . |
| 1182438 | 7/1989 | Japan . |

OTHER PUBLICATIONS

Product Information on "Sentricon" from Dow Agro-Sciences 1998.
Product Specimen Label on "Recruit II" from Dow Agro-Sciences Feb. 5, 1999.
Termites and Termite Control by Light, S.F., Horner, A.C., Randall, Merle, Herns, W.B. and Bowe, Earl E. published by the University of California Press, Berkeley, 1946.

*Primary Examiner*—Peter M. Poon
*Assistant Examiner*—Judith A. Nelson
*Attorney, Agent, or Firm*—Ross, Ross & Flavin

[57] ABSTRACT

A method for preventing or precluding migration of termites or insects through a possible area of migration for example between a concrete slab (13) and a brick wall (28) erected on the slab (13) including the step of applying to a possible area of migration as for example a join line (15) between the slab (13) and wall (28), a settable or curable barrier material which defines a barrier to termite or insect migration through said area. The barrier material may define a physical barrier or may incorporate a chemical to define a chemical barrier. The method may be used also for preventing termite penetration along pipes (19) penetrating a slab (13) by providing beads (68) around the pipe (19) within the slab (13) or at the junction between the pipe (19) and slab (13).

8 Claims, 6 Drawing Sheets

METHOD AND MEANS FOR PREVENTING OR MINIMIZING TERMITE ATTACK OR INFESTATION

TECHNICAL FIELD

This invention relates to a method and means for preventing or minimising termite attack or infestation which is particularly but not exclusively suited to applications in buildings.

Building destroying termites are most commonly subterranean. Their attack/infestation originates from the nest (colonies) located either underground or in the base of trees, with tunnels (foraging galleries) radiating from the nest through the soil to food sources.

At all times termites require moisture but must conceal themselves from direct sunlight. Thus for travel across exposed walls, for example, they build mud-like shelters (tunnels) "plasters" on the outside in which they can travel concealed from sunlight to their food source. The area for subterranean migration may comprise a crack, fissure, joint, opening, perpend or the like in an outer wall or footing.

BACKGROUND ART

Due to changes in government regulations in Australia and elsewhere, past methods of preventing termite attack or entry in buildings which have involved the use of pesticides under the slab and around the outside periphery of a building are now no longer possible to employ because of the detrimental effects of the residual chemical poisons. While new chemicals have been introduced to overcome this problem, such chemicals prove considerably more expensive to use. As a result, a number of different methods have been proposed or are now used with the aim of combating termite infestation or migration.

One such method involves the use of a product known as TERMIMESH which comprises a mesh of stainless steel which has pores of sufficiently small size to prevent the passage of termites therethrough. While such a material is effective, it is required to be "parged" at one edge to secure it in position. This is difficult to accomplish in certain positions and furthermore a number of inspections must be undertaken to ensure that the mesh is effectively secured in position by the parge and/or to ensure that no damage has been caused to the mesh. In addition, the use of this product tends to be particularly expensive.

Japanese patent literature, such as 316502/92, 88836/90, 250308/88, 99301/87, 346047/93 and 18822/84 describe methods of termite control which are particularly suited to the elevated timber structures mostly utilised in Japanese dwelling construction, chosen for its earthquake resistant properties. In such above ground structures, entry points for termites are not concealed and thus can be treated after construction and accessed during the life of the structure. However the Japanese patents are aimed at the provisions of alternate poisons which are less harmful and to methods for their use.

Japanese patent application No. 80008/92 describes methods of spraying treatment to areas about buildings where termites may breed in order to prevent such breeding. It describes the use of polyurethane resins to carry and encapsulate poisons whereby the effect of the poison is maintained for extended periods, unlike earlier methods where the termiticides used are dissolved by the resins such that their effectiveness is reduced or lost. The polyurethane resin mixtures formed are also useful as moisture barriers which can be applied to the ground under slabs to provide the dual purpose of moisture proofing and provision of a long term poison.

It is considered that the use of any poison is disadvantageous and the need to deposit sufficient mixture to cover the ground under a concrete slab would be very costly in terms of the volume of chemical required.

The present invention aims to overcome or alleviate at least one of the above disadvantages by providing improved methods of and means for preventing or minimising the passage or migration of termites or other insects into a building. The present invention, in a further aspect aims to provide methods and means which may be applied to protect building products and components from termites or other insects. Other objects and advantages of the invention will become apparent from the following description.

SUMMARY OF THE INVENTION

The present invention thus provides in a first aspect, a method of preventing or minimising migration of termites into a structure having a ground supported termite resistant base support which on completion extends below the adjacent ground level and supports an above ground structure including a concealed wall structure containing termite consumable material concealed by an outer wall skin, the method comprising forming insitu during construction, a continuous termite penetration resistant barrier by applying a settable or curable termite or insect resistant barrier mixture which when applied cures to form a continuous flexible penetration resistant barrier which adheres to and extends between an above ground exposed portion of the outer wall skin and a face of the termite resistant base support which is below the concealed wall structure, filling cracks and fissures in the outer wall skin and the termite resistant base support, whereby termite entry to the concealed wall structure from an in-ground nest can occur only if the termites enter across the exposed part of the flexible penetration resistant barrier on the above-ground portion of the outer skin thereby providing visible evidence of their penetration.

The barrier material may define when cured or set a physical barrier which could contain a chemical barrier.

The present invention, in one aspect is particularly applicable to buildings having concrete slabs and brick walls in which cracks, fissures, may be created and adjacent to which, in the supported wall structure, perpends or joints are created through which termites may travel to consumable material in the wall structure. In accordance with the method of the present invention, such fissures, cracks or joints are filled or sealed by the settable or curable barrier material referred to above when the curable barrier material is applied to create the continuous flexible penetration resistant barrier, so as to prevent termite or insect passage therethrough.

In one particular application where a concrete slab is formed, to be supported on a footing about the periphery of a building, the junction between the slab and footing is also sealed with the barrier material as referred to above to prevent passage of termites or insects from the ground beneath the slab through the junction between the slab and footing. In addition, the inner and top of the brickwork and/or outer faces of the brick foundation may be sealed with a layer of the compound liquid or substance. This will prevent termites or insects from entering through imperfect mortar between the brick courses, joints or the brick perpends.

In a typical application, where external brickwork of a building defines the peripheral formwork for the slab of a building, the upper surface of the brickwork and adjacent recessed portion of the slab, or an inner course of bricks in the case of a cavity brick construction, is sealed with a layer of the settable or curable barrier material as referred to above to prevent the passage of termites or other insects between the outer brick course and slab.

The settable or curable barrier material which forms the termite or insect barrier may be selected from a range of different products or combinations of products. It may be in the form of a paste, gel, liquid or a matrix mix. As an example, the barrier material may define a unicellular membrane, that is a membrane in which a cellular chemical agent such as a termiticide is encapsulated.

The barrier material may include polymer binders, mineral extenders, biocides, fungicides, mould inhibitors, acrylic resins, acrylic emulsion powered acrylic polymers, and or moisture control and plasticising agents. The settable or curable barrier material may additionally include a chemical or chemicals which comprises a termiticide or insecticide or other insect or termite deterrent.

The settable or curable barrier material may be applied to a building or component in any suitable manner, for example by being sprayed, painted, trowelled, brushed or by splatter machine. Alternatively, where appropriate, the settable or curable barrier material may be supplied in a cartridge tube or the like for application in the nature of a mastic.

The settable or curable barrier material may also be applied to other building products, such as timber poles or posts to fill cracks or fissures in the post or poles to prevent termite or insect passage therethrough. In the case of concrete slabs, the settable or curable barrier material may also be applied around slab penetrations, such as around penetrating pipes at the upper side of the slab to prevent termites or insects from passing between the pipe and slab material. Alternatively, the settable or curable barrier material may be applied as a flexible bead about the penetrating pipe and within or adjacent to the concrete slab to prevent insects or termites passing along the penetration and through the slab.

The settable or curable barrier material may when installed to brick walls also preferably provides a certain degree of water repellent or water resistant properties.

The settable or curable barrier material may also be applied to draft walls or retaining walls and on either side thereof to prevent entry of the termites or insects through the joints and perpends.

In one particular form, the settable or curable barrier material may be in the nature of a liquid or a material with flowable properties, such that it flows into and thereby block cracks which may be formed. The settable or curable barrier material in this form may also have properties which allow it to expand within the cracks to fill the cracks to prevent termite or insect passage through the cracks.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE EMBODIMENTS

Figure 1:
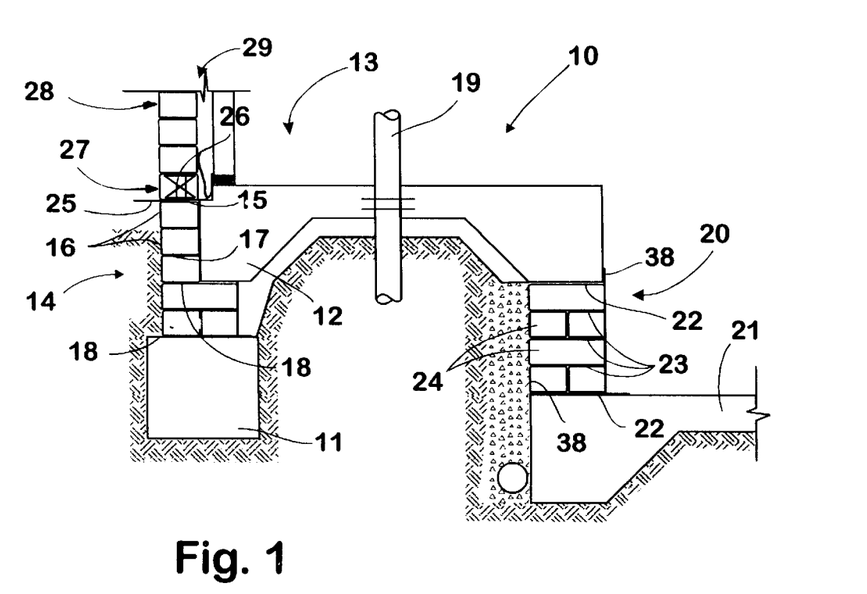
FIG. 1 illustrates in sectional view typical applications of the method and means of the invention in a bricked up slab construction.

Referring to the drawings and firstly to FIG. 1, there is illustrated the general layout of a brick-up building foundation construction 10 which in this instance includes a footing 11 which extends about the periphery of the building to support the peripheral beam 12 of a concrete slab 13 and an outer Skin which is brick and which during construction has a course 14 which, acts as the formwork for the slab 13 and which may support the beam 12 onto the footing 11. Slab and footing reinforcement is not shown for the purposes of clarity. The slab 13 is also formed with a recess 15 in its outer periphery which is at the level of the upper level of bricks 16 in the course 14.

It will be apparent in this construction that a crack or fissure 17 may be created in the join line between the inner face of the course of bricks 14 and the slab beam 12. Similarly, a join line 18' is created between the slab beam 12 and the bricks which support the beam 12 on the footing 11. If untreated, the join lines 17 and 18 define passages for termites or other insects into the building. In addition in this construction, a penetration such as a waste pipe 19 penetrates the slab 13 forming another area of possible penetration of termites from beneath the slab.

The construction 10 also includes a brick wall 20 forming a step down to a further slab 21. This creates further join lines 22 providing possible areas for termite penetration between the wall 20 and slabs 13 and 21. The joints 23 between the bricks 24 forming the wall 20 form other possible termite penetration paths.

Figure 3:
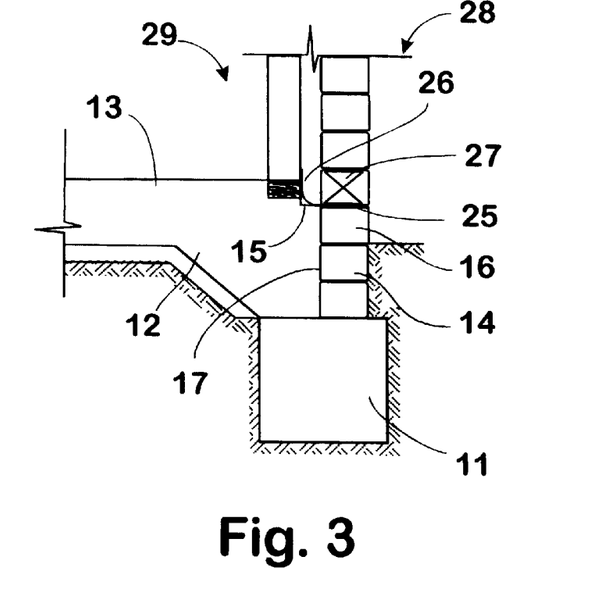
FIG. 3 illustrates in sectional view, the termite sealing arrangement at the external wall of a bricked up slab.

In accordance with an embodiment of the present invention, and as shown in FIG. 3 which illustrates a slightly different form of brick-up construction where the slab 13 is supported directly on the footing 11, a layer 25 which forms a termite barrier is applied over the top of the top brick 16 in the course 14 to extend into and cover the adjacent recess 15 in the periphery of the slab 13. It will be apparent that the layer 25 therefore spans the join line 17 between the brick course 14 and slab beam 12 and slab 13 as well as sealing the extrusion openings in the bricks 16 to thereby act as a barrier to prevent termite or other insect migration through and along the join lines 17 and 18.

The layer 25 may also be applied over the external faces of the bricks 16 and the joints between the bricks 16 to seal the bricks 16 and the joints 23 between the bricks 16 as shown in dotted outline in FIG. 3. The layer 25 may be applied by brushing, spraying, trowelling or any other suitable application means. The layer 25 may also be sufficiently fluid to partially flow into the join 17 to act as a barrier to termite migration. As an example, the layer 25 may be in the nature of a mortar, a hardenable liquid or a resin such an epoxy resin to form a continuous flexible penetration resistant barrier.

The mortar, a hardenable liquid or a resin may also incorporate a termiticide or other poison or repellent for example an organic phosphate. One or more coats of the mixture may be applied to the areas to form the layer 25 to ensure the possibility of termite penetration is minimised. The layer 25 may also have additional water sealing properties to seal the bricks 16 or act as a flashing. Alternatively or additionally, a conventional flashing 26 may be used over the layer 25 below the weep hole course 27 of the external wall 28.

After the layer 25 has cured, the external and internal walls 28 and 29 of the building may be erected in a known manner to be supported on the course 14 of bricks 16 or beam 12 and slab 13. In the illustration, a brick veneer construction results with the outer wall 28 being a single layer of bricks and the inner wall 29 being a wooden frame to which cladding may be applied.

Corresponding components/features of the invention applied to the embodiment of FIG. 1 Are given the same reference numerals as used in FIG. 3.

The brick or block draft wall 20 which is provided between upper and lower slabs 13 and 21 in FIG. 1 may also be sealed in accordance with the invention. In this instance, a layer 38 of the barrier material of the invention may be applied to the inner and outer sides of the wall 20. The layers 38 are extended upwardly and downwardly to cover the join lines 22 between the slabs 13 and 21 and bricks or blocks which are at the upper and lower sides of the wall 20. The layer 38 may also have additional water sealing properties for sealing the wall 20. The arrangement described above prevents the passage of termites or insects into the building from the ground beneath the slabs 13 and 21 by blocking the passages between the bricks or blocks or along the join line 22 which defines a passage for termites or other insects into the building. If desired also layers of the material may be provided along the join lines 22 between the wall 20 and slabs 13 and 21.

Figure 2:
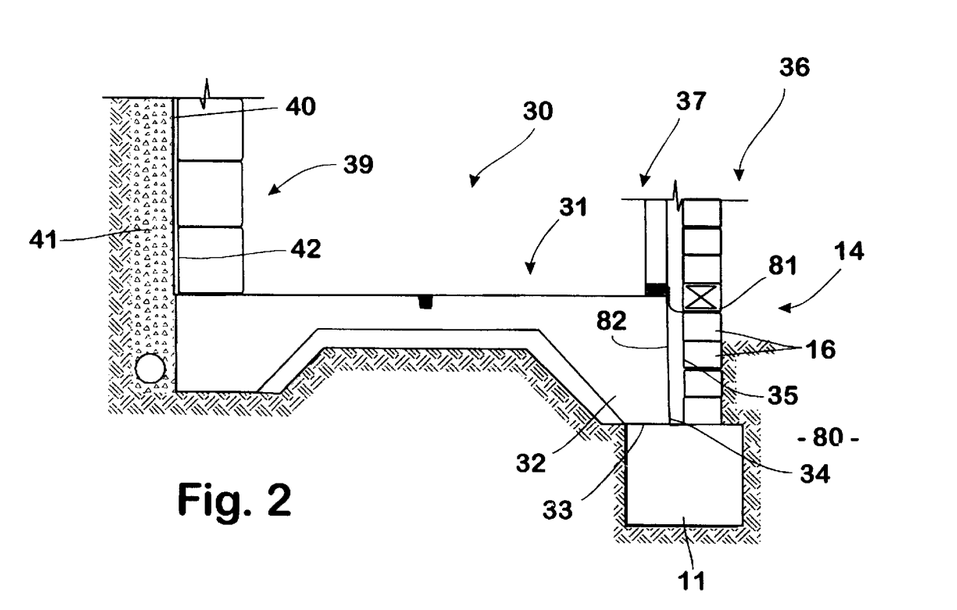
FIG. 2 illustrates in sectional view further typical applications of the method and means of the invention in a boxed up slab construction.

FIG. 2 illustrates an alternative form of building foundation 30 in which in this case, the slab 31 is boxed up using formwork and is spaced from the outer course 14 of bricks, the slab 31 and brick course 14 being supported on the footing 11. Again, however, the slab 31 which has a perimeter beam 32 supported on the footing 11 defines a join line 33 which may create a passage to insects or termites. Termites may also enter from the ground 80 through gaps in the mortar between bricks 16 and travel along the face 82 To the inner wall.

In this instance, a layer 34 according to the invention is applied at the junction of the slab beam 32 and footing 11 to seal off the join line 33 to thereby prevent the passage of termites and insects through the join line 33.

A further layer 35 may also be applied to the inside vertical faces of the brick course 14 and the joint between the brick course 14 and footing 11. The layer 35 may also be continued over the top of the uppermost brick 16 in the course 14. This will prevent termites from entering through imperfect mortar between the brick 16 at the joints between the bricks or perpends and sealing the extrusion openings in the bricks 16. The layers 34 and 35 may also have additional water sealing properties for sealing the bricks 16 or act as flashings. Outer and inner walls 36 and 37 may be erected as before to form a brick veneer construction.

It will be seen that if termites try to enter the internal wall 37 from a nest in the ground 80 their path through the mortar joints will be blocked by the layer 35, such that they can not penetrate the footing 11 or slab 31. The joint therebetween is blocked by the layer 34 which joins to the layer 35 and thus they will have to travel up the outer face of the bricks 16 past the exposed edge 81 of the layer 35 and then into the wall cavity for access to the interior wall 37. This will lead either prevent their entry or if they do enter they will leave a visible path over the edge 81 which will enable simple detection and eradication.

Figure 4:
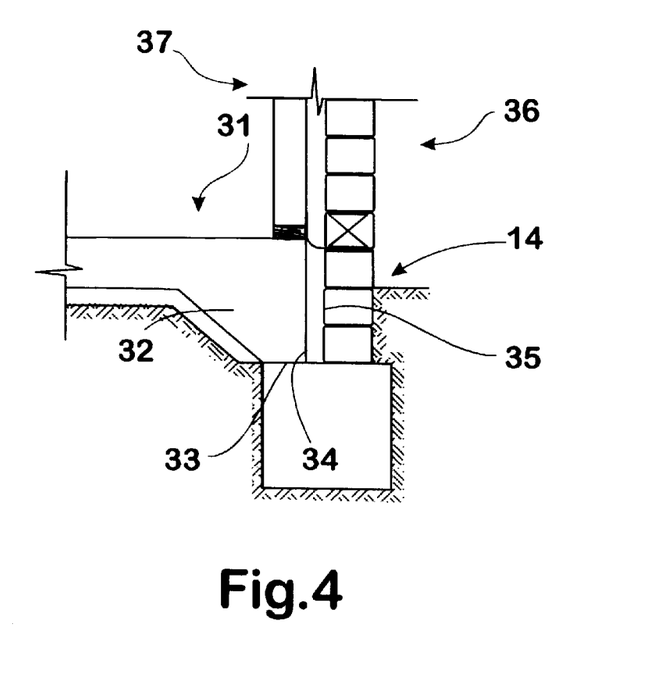
FIG. 4 illustrates in sectional view, the termite sealing arrangement at the external wall of a boxed up slab application of the invention.

A similar arrangement is shown in FIG. 4. As shown in FIG. 2, the layers 34 and 35 may merge into each other or be separate as shown in FIG. 4.

FIG. 2 also shows an arrangement where a retaining wall 39 of blocks or bricks is erected on the slab 31. In addition to a protective water proof sheeting 40 between the wall 39 and adjacent earth 41, the face of the wall 39 is provided with a layer 42 of the barrier material according to the invention which seals the joints between the bricks or blocks forming the wall 39 and the joint between the wall 39 and slab 31 against ingress by termites, the layer 42 extending downwardly beyond the lowermost block in the wall 39 and over the slab 31.

Figure 5:
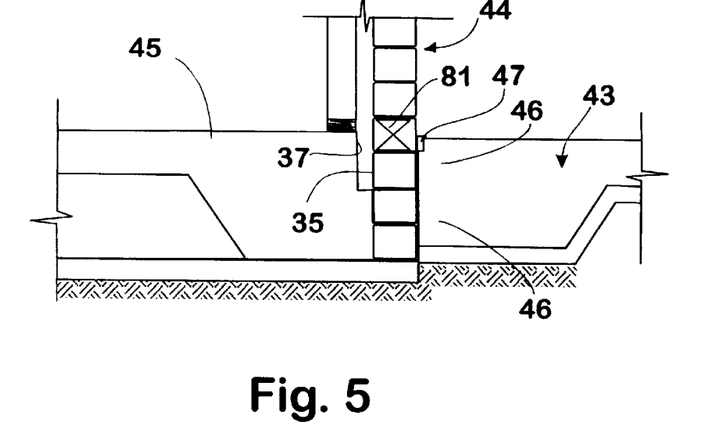
FIGS. 5, 6, 7 and 8 illustrate the application of the invention to new or extension slabs.

Referring now to the embodiment of FIG. 5, there is illustrated an extension slab 43 constructed adjacent an existing wall 44 and slab 45, in this case a slab 45 on a waffle pan foundation. A rebate 46 is formed in the upper edge of the slab 43 adjacent the brick wall 44. The barrier material 47 of the invention is applied to fill the rebate 46 and seal the space between the slab 43 and brick wall 44 for preventing termite or insect passage from the ground and between the slabs 43 and 45 and wall 44. If desired for additional protection, a bead of the barrier material 46 may also be provided between the slabs 45 and 43 to prevent termite penetration from below, the bead 46 extending along the periphery of the slabs 45 and 43 and between the slabs 45 and 43 to provide a complete seal.

However it will be seen that the flexible layer 35 which extends from the outer edge 81 to the slab 45 prevents entry to the inner wall 37 other than across the exposed edge 81 as in the earlier described constructions.

Figure 6:
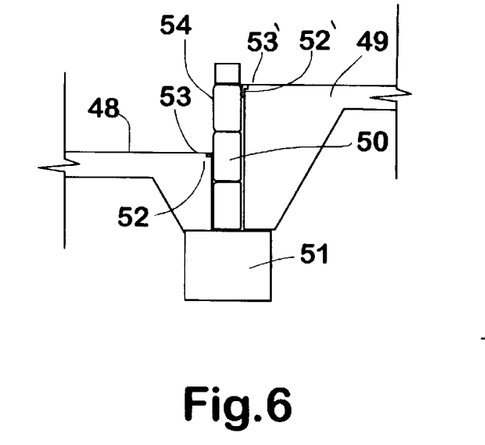
Figure 7:
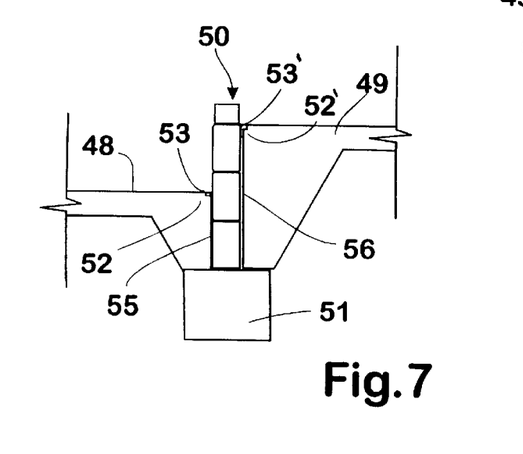

FIGS. 6 and 7 illustrates a further embodiment of extension slab 48 applied to a construction where a an slab 49 and a brick course 50 is supported on a footing 51 adjacent an existing slab 48 on the footing 51. Again a rebate 52 is provided in the edge of the slab 48 adjacent the brick wall 50 and is filled with the substance or material 53 which fills the rebate 52 and seals the space between the slab 48 and brick wall 50.

A similar arrangement is provided between the slab 49 and wall 50 wherein a rebate 52' is filled with material 53'. Further material 54 in the form of a layer may be provided to extend continuously from the material 53 and 53' applied to the rebates 52 and 52' along the side of the brick wall 50 and over the top thereof for providing a complete seal for preventing termite or insect passage from the ground.

FIG. 7 illustrates an alternative sealing arrangement wherein layers 55 and 56 are provided on opposite sides of the wall 50 to extend downwardly and continuously from the materials 53 and 53' in the rebates 52 and 52' in the slabs 48 and 49 to the footing 51.

Figure 8:
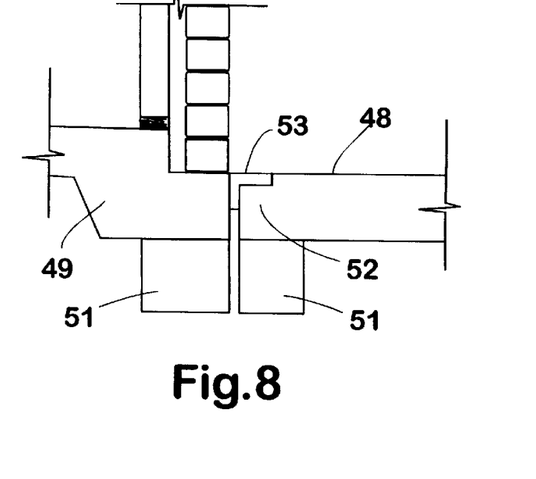
Figures 9, 10, 11:
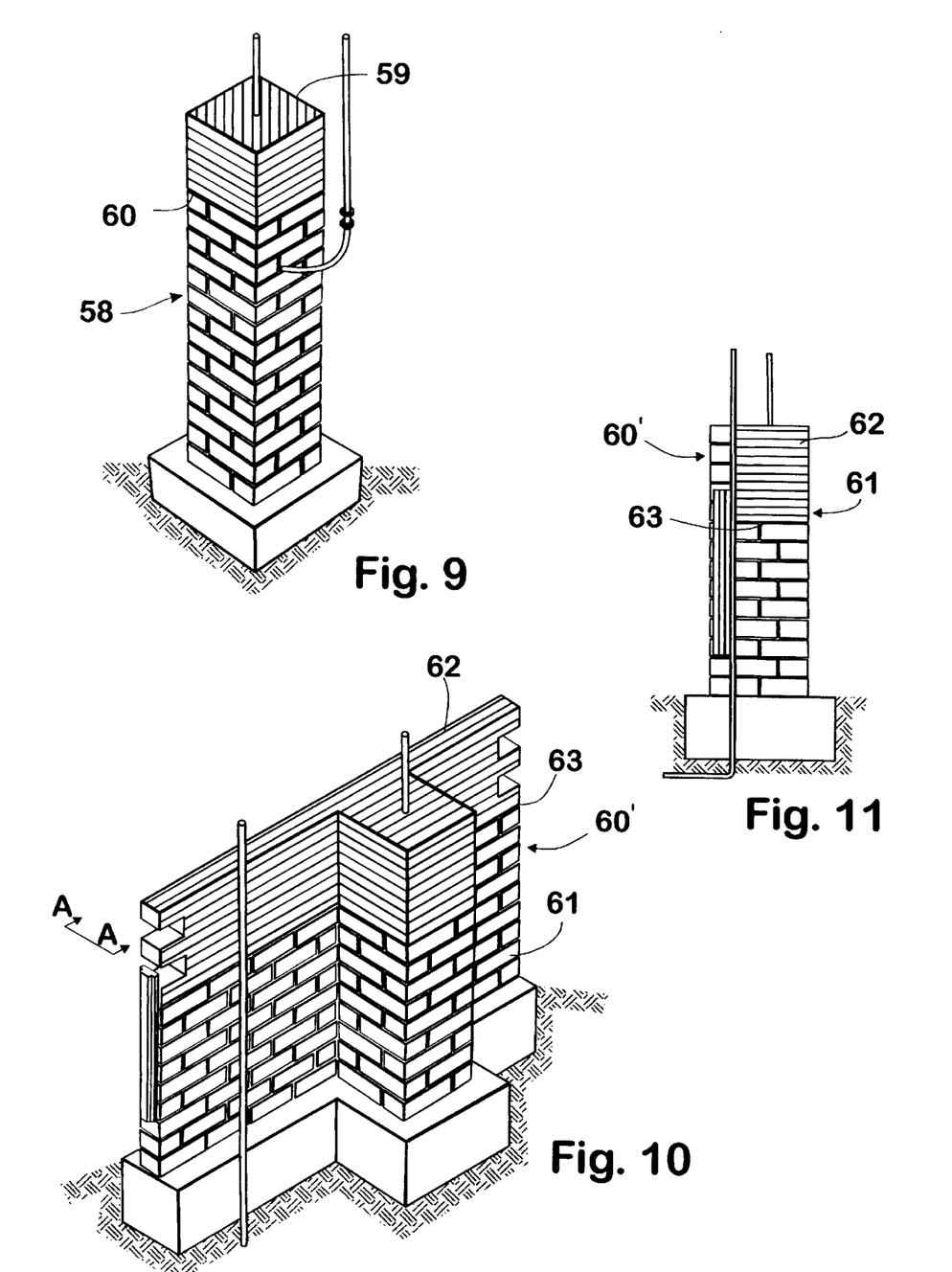
FIGS. 9 and 10 illustrate the application of the invention to isolated brick piers and brick walls with engaged piers respectively.
FIG. 11 is a view in the direction A—A of FIG. 10.

In the arrangement of FIG. 8, the add-on slab 48 is erected on a further footing 51' adjacent the existing footing 51. Again a rebate 52' is formed in the add-on slab 48 adjacent the existing slab 49 which is filled with the barrier material 52' which also extends downwardly between the slabs 48 and 49 as illustrated. In each of the above embodiments, the rebates formed in the slab preferably extend continuously along the edge of the slab to ensure that a complete seal is established by the barrier material.

Where an isolated brick pier 58 is erected, as shown in FIG. 9, the upper portion of the pier 58 may be sealed with a layer 59 of material according to the invention, the layer 59 extending over the top of the pier 58 and down the sides of the pier 58, usually a distance of 150 mm to 400 mm. The layer 59 may terminate in a bead 60 of the material surrounding the pier 58. Again termite entry must be over the exposed layer 59 down the sides of the pier to provide a visible indication of termite entry.

A similar arrangement is shown in FIGS. 10 and 11 where a brick wall 60' with engaged pier 61 is sealed by a layer 62 of barrier material according to the invention, the layer 62 extending over the top of the wall 60' and pier 61 and down the sides thereof, in this case usually to a distance of 150 mm to 400 mm to again terminate in a bead 63.

Figure 12:
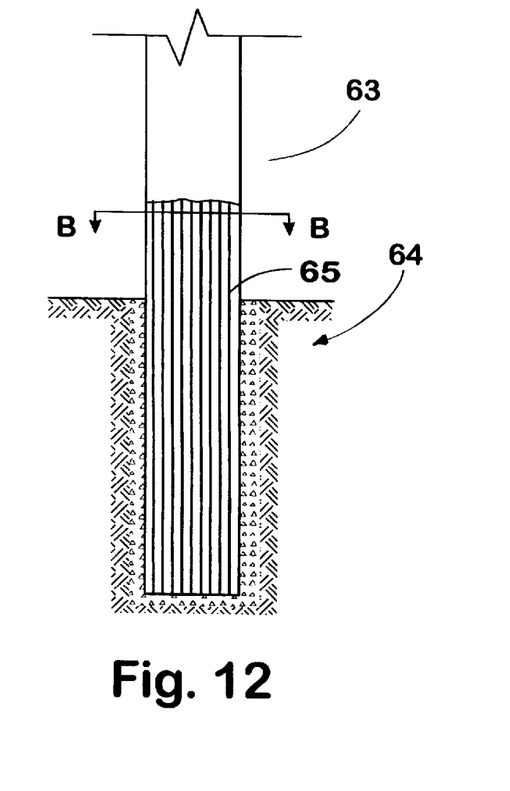
FIG. 12 illustrates the application of the invention to ground installed poles or posts.
Figure 13:
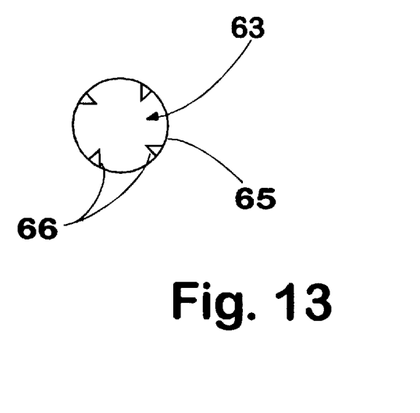
FIG. 13 is a sectional view of the pole of FIG. 12 along line B—B.

FIG. 12 illustrates the application of the invention to a pole or post 63 which is located in the ground 64. A layer 65 of material, according to the present invention is applied about the lower end of the pole 63 to enter any cracks or fissures 66 within the pole 63 as shown in FIG. 12 or 13 to prevent termites forming their galleries in the cracks or fissures 66 and being undetected. The layer 65, as shown in FIG. 11 or 12 is applied to the end of the pole 63 to a sufficient height such that it extends above the ground 64.

Figure 14:
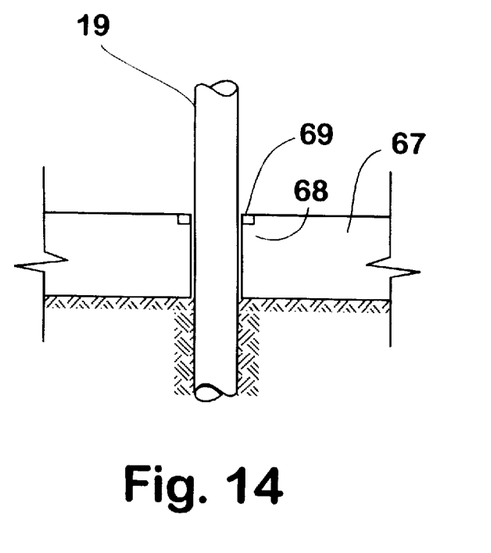
FIGS. 14 to 17 illustrate the application of the invention to pipe penetrations.

FIG. 14 illustrates a typical application of the invention where pipes 19 (as in FIG. 1) penetrate a slab 67. A recess 68 of annular form may be formed in the slab 67 around the pipe 19 to receive the liquid or substance 69 according to the present invention which seals about the pipe 19 and between the pipe 19 and slab 67 to provide a termite and insect barrier. The recess 68 may be formed during slab construction or after curing of the slab 67.

Figure 15:
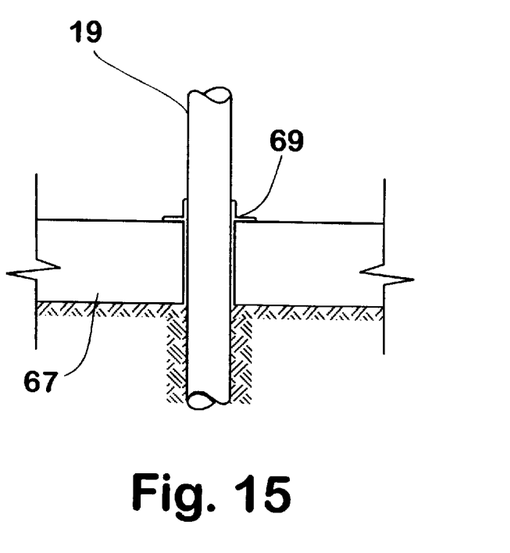

FIG. 15 illustrates a further application of the invention to a pipe 19 penetrating a slab 67. In this instance, the material 69 is simply applied around the upper side of the slab 67 to seal against the penetrating pipe 19.

Figure 16:
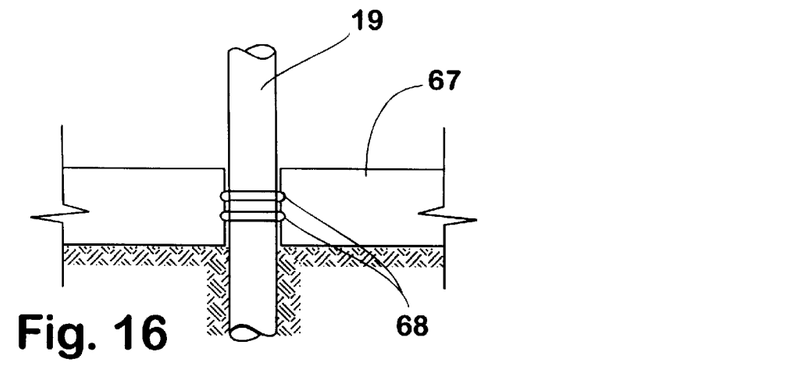

FIG. 16 illustrates an application of the invention again where a pipe 19 penetrates a slab 67. In this instance, the sealing material 68' in accordance with the invention in the form of one or more beads is located in situ within the slab 67 to surround and seal against the penetrating pipe 19. The beads of sealing material 68' are applied prior to pouring of the slab 67 so as to be embedded within the slab.

Figure 17:
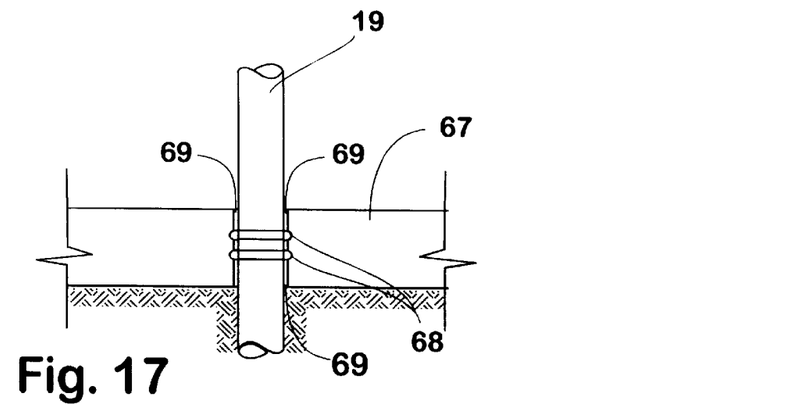

FIG. 17 illustrates an application where a pipe 19 which is provided with lagging 69 penetrates a slab 67. As in the embodiment of FIG. 16, the material 68' in the form of beads around the pipe 19 are provided within the slab 67 to provide a termite or insect barrier between the pipe 19 and slab 67. For installation, the lagging 69 is provided in sections 69' and 69". The upper and lower sections 69' and 69" may be removed to allow application of the barrier material 68' and thereafter the sections 69' and 69" are reinstalled as shown.

The barrier material as described is used in specific building applications associated with building slabs. It may, however, be applied to other applications where a crack or join line appears or for example in openings through bricks or blocks including extrusion openings which may be sealed with a layer or compound according to the present invention to block insect or termite passage.

Figure 18:
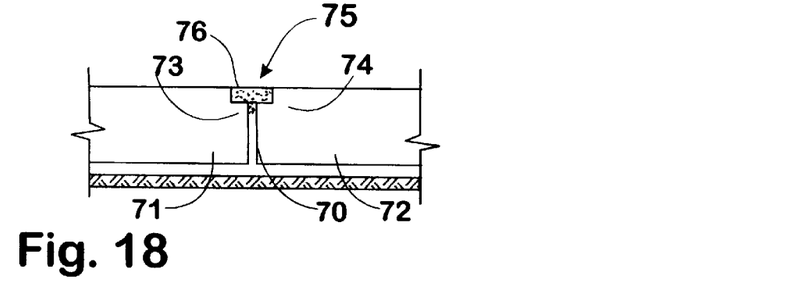
FIGS. 18 and 19 illustrates an application of the invention to construction joints between slabs.
Figure 19:
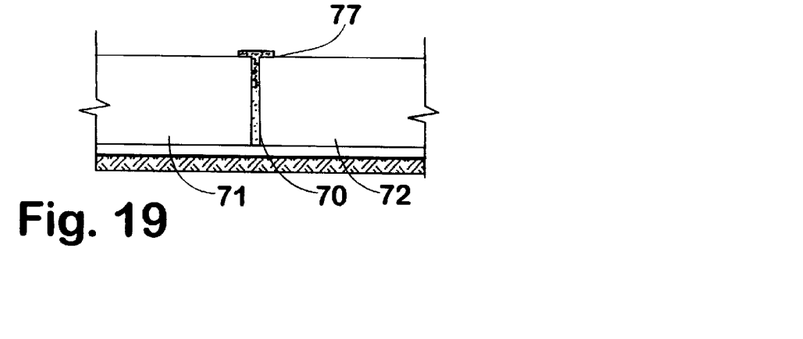

Referring now to FIG. 18, there is illustrated and application of the invention to a construction joint 70 between adjacent building slabs 71 and 72. On the upper side of the slabs 71 and 72 and along the joint line 70, recesses or rebates 73 and 74 are provided in the respective slabs 71 and 72, the rebates 73 and 74 defining a recess 75 extending along the join line 70. The barrier material 76 in accordance with the invention is deposited into the recess 75 to substantially fill the recesses 73 and 74 and also extend into the joint 70. This will prevent passage of insects and termites from the ground beneath the slabs 71 and 72 through the joint line 70.

Where larger cracks or fissures are encountered additional support may be required to be provided to the compound liquid or substance which forms the termite barrier. Additional support may be provided by a matting, such as a fibreglass matting or other material which may initially be laid over the larger crack or fissure and thereafter the compound liquid or substance deposited upon the mat. This will provide sufficient support to the compound liquid or substance to act as a barrier for termites and insects. An example of such an arrangement is shown in FIG. 19 where the mating 77 spans the join line 70 between slabs 71 and 72. This arrangement may be provided in any of the applications described above.

The present invention thus provides an arrangement where a complete termite barrier is created for a building. All potential entry points within the slab and perimeter area may be treated in the manner described above.

Whilst the above has been given by way of illustrative embodiment of the invention, all such modifications and variations thereto as would be apparent to persons skilled in the art are deemed to fall within the broad scope and ambit of the invention as defined in the appended claims.

What is claimed is:

1. A method of preventing or minimising migration of termites into a structure having a ground supported termite resistant base support, which on completion extends below the adjacent ground level and supports an above ground structure including a concealed wall structure containing termite consumable material concealed by an outer wall skin, the method comprising the steps of:

applying in situ during construction a settable or curable flexible termite penetration resistant barrier mixture to an above ground exposed portion of the outer wall skin and a face of the termite resistant base support to form a continuous termite penetration resistant barrier which adheres to and extends between the above ground exposed portion of the outer wall skin and the face of the termite resistant base support which is below the concealed wall structure; and filling cracks and fissures in the outer wall skin and the termite resistant base support with the barrier mixture so that termite entry to the concealed wall structure from an in-ground nest can occur only if the termites enter across the exposed part of the flexible penetration resistant barrier on the above ground portion of the outer wall skin thereby providing visible evidence of their penetration.

2. A method according to claim 1, which includes applying the settable or curable mixture continuously about a pipe which penetrates the termite resistant base support, prior to pouring a concrete slab about the pipe, the concrete slab defining the termite resistant base support.

3. A method according to claim 2, wherein said barrier mixture is applied to form a flexible bead about said penetrating pipe.

4. A method according to claim 1, which includes applying the settable or curable mixture fully across an upper surface of an above ground layer or course of bricks of an outer wall to the exposed surface of the outer wall skin, and down one face of the bricks to a concrete slab prior to the addition of further layers or courses of bricks on the upper surface of the above ground layer or course of bricks to form the outer wall.

5. A method according to claim 4, which includes applying the settable or curable mixture on an inner face of the bricks.

6. A method according to claim 5, which includes applying the barrier mixture to outer faces of a brick foundation.

7. A method according to claim 4, which includes applying a layer of the barrier mixture to an upper surface of a brickwork course and to an adjacent recessed portion of the concrete slab, the outer wall being an external brickwork wall having lower courses which, during construction, form a peripheral formwork for the concrete slab.

8. A method according to claim 1, which includes applying the settable or curable mixture continuously about a perimeter of a concrete slab beneath a rebate or ledge, the termite resistant base support being the concrete slab having the edge or rebate for supporting a timber plate of the above ground structure.

* * * * *